United States Patent
Wu (10) Patent No.: US 12,027,974 B2
(45) Date of Patent: Jul. 2, 2024

(54) CONTROL CIRCUIT AND SWITCHING CONVERTER

(71) Applicant: Silergy Semiconductor Technology (Hangzhou) LTD, Hangzhou (CN)

(72) Inventor: Dong Wu, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 229 days.

(21) Appl. No.: 17/554,198

(22) Filed: Dec. 17, 2021

(65) Prior Publication Data

US 2022/0216785 A1 Jul. 7, 2022

(30) Foreign Application Priority Data

Jan. 6, 2021 (CN) .................... 202110014397.X (51) Int. Cl.
*H02M 3/155* (2006.01)
*H02M 1/08* (2006.01)
*H02M 1/15* (2006.01)

(52) U.S. Cl.
CPC ............. *H02M 3/155* (2013.01); *H02M 1/08* (2013.01); *H02M 1/15* (2013.01)

(58) Field of Classification Search
CPC ........... H02M 3/155; H02M 1/08; H02M 1/15
USPC ....................................................... 323/282
See application file for complete search history.

(56) References Cited

U.S. PATENT DOCUMENTS

| 6,670,794 | B1 | 12/2003 | Wang et al. |
| 7,733,675 | B2 | 6/2010 | Wu et al. |
| 8,134,353 | B2 | 3/2012 | Chen et al. |
| 9,071,164 | B2 | 6/2015 | Schroeder et al. |
| 9,263,955 | B2 | 2/2016 | Schmid et al. |
| 10,218,274 | B1 * | 2/2019 | Chan ....................... H02M 1/14 |
| 10,491,106 | B2 | 11/2019 | Bhandarkar et al. |
| 10,826,380 | B2 | 11/2020 | Zhang |
| 2012/0200274 | A1 | 8/2012 | Tang et al. |
| 2020/0014293 | A1 * | 1/2020 | Zhang ..................... H02M 1/14 |
| 2020/0021191 | A1 * | 1/2020 | Huang .................. H02M 3/158 |

FOREIGN PATENT DOCUMENTS

| CN | 106416034 A | 2/2017 |
| CN | 206259862 U | 6/2017 |
| CN | 108512422 B | 9/2018 |

* cited by examiner

*Primary Examiner* — Yemane Mehari (57) ABSTRACT

A control circuit for a switching converter, can include: a ripple signal generation circuit configured to generate a ripple signal with a same frequency and phase as an inductor current of the switching converter, where the ripple signal changes between zero and a preset value; a superimposing circuit configured to superimpose the ripple signal on a feedback signal representing an output voltage of the switching converter, in order to generate a loop control signal; and a switching control signal generation circuit configured to generate switching control signals according to the loop control signal and a reference signal, in order to control a switching state of a power stage circuit in the switching converter.

12 Claims, 7 Drawing Sheets

CONTROL CIRCUIT AND SWITCHING CONVERTER

RELATED APPLICATIONS

This application claims the benefit of Chinese Patent Application No. 202110014397.X, filed on Jan. 6, 2021, which is incorporated herein by reference in its entirety.

FIELD OF THE INVENTION

The present invention generally relates to the field of power electronics, and more particularly to control circuits and switching converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A switching converter may utilize voltage mode and current mode, in order to control the state of the power stage circuit to generate a stable output voltage. In order to address sub-slope oscillation of the output of the switching converter, a constant on-time control based on the ripple voltage can be used to control the switching converter. This control method can actively improve the stability of the system.

Figure 1:
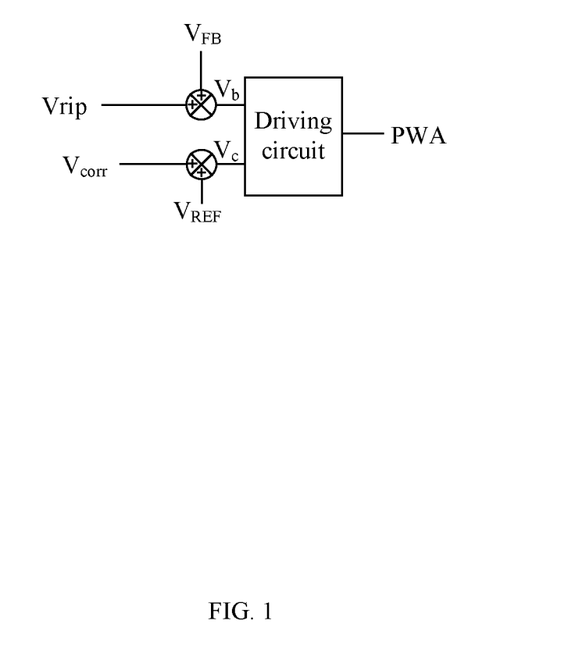
FIG. 1 is a schematic block diagram of an example control circuit for the switching converter under the constant on-time control based on a ripple signal.
Figure 2:
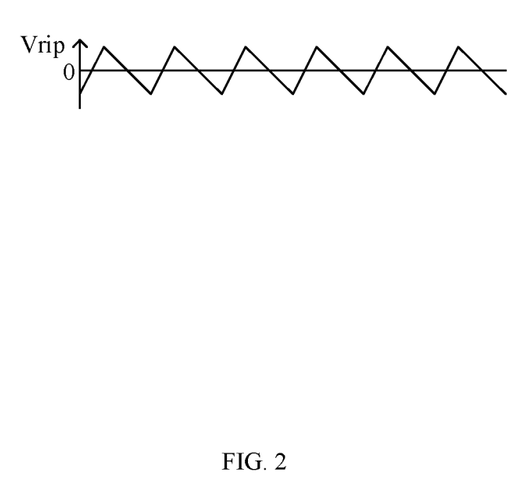
FIG. 2 is a waveform diagram of the example ripple signal of FIG. 1.

Referring now to FIG. 1, shown is a schematic block diagram of an example control circuit for the switching converter under constant on-time control based on a ripple signal. In this example, ripple signal Vrip can be superimposed on feedback voltage $V_{FB}$ representing an output voltage of the switching converter to generate input voltage Vb. Referring now to FIG. 2, shown is a waveform diagram of the example ripple signal. As shown, assuming that a peak-to-peak value of ripple signal Vrip is Vp, ripple signal Vrip can vary between $-\frac{1}{2}$ Vp and $\frac{1}{2}$ Vp, and the average value of ripple signal Vrip may be zero. Due to the existence of the ripple signal, there can be a difference of a DC bias voltage between feedback voltage $V_{FB}$ and reference voltage $V_{REF}$. Referring back to FIG. 1, in order to eliminate the DC offset voltage caused by injection of the ripple signal, correction signal Vcorr can be superimposed on reference voltage $V_{REF}$ to generate input voltage Vc. In this example, correction signal Vcorr can be generated according to an error between feedback voltage $V_{FB}$ and reference voltage $V_{REF}$. When the switching converter operates in a steady state, the amplitude of correction signal Vcorr can be $\frac{1}{2}$ Vp. The driving circuit can control the switching state of the power switch in the power stage circuit according to input voltages Vb and Vc.

However, on the one hand, this control method may be equivalent to having two voltage loops. The inner voltage loop can respond to feedback voltage $V_{FB}$, in order to quickly respond to load dynamic "jumps." The outer voltage loop may respond to correction signal Vcorr, to eliminate steady-state errors. The regulation speed of the inner loop can be relatively fast and the regulation speed of the outer loop relatively slow, which can affect dynamic performance. On the other hand, the correction signal may need to be designed according to the peak-to-peak value of the ripple signal, and may have a preset variation range. This can lead to the output voltage being out of adjustment due to limitations of the variation range of the correction signal under light load conditions, thereby reducing system accuracy.

Figure 3:
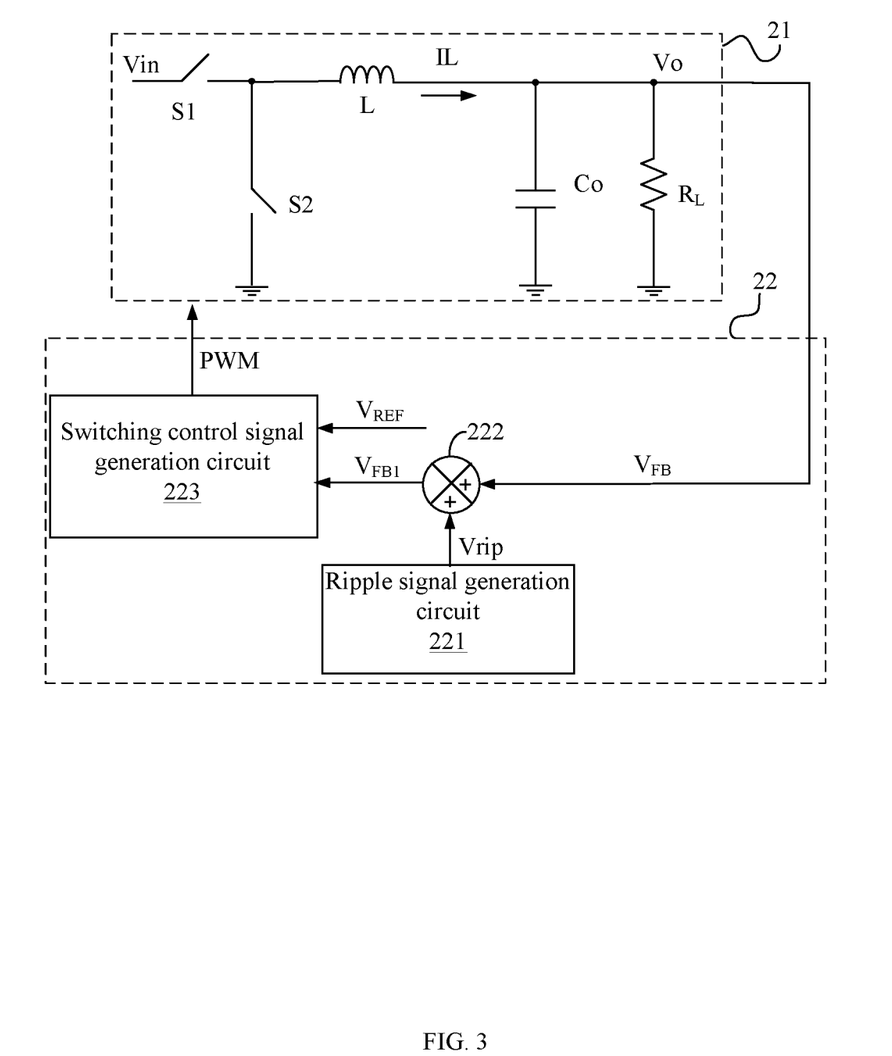
FIG. 3 is a schematic block diagram of an example switching converter, in accordance with embodiments of the present invention.

Referring now to FIG. 3, shown is a schematic block diagram of an example switching converter, in accordance with embodiments of the present invention. The switching converter can include power stage circuit 21 (e.g., a buck topology) and control circuit 22. In this example, power stage circuit 21 can include power switch S1, power switch S2, inductor L, and output capacitor Co. For example, a first terminal of power switch S1 can connect to input voltage Vin, a second terminal of power switch S1 can connect to a first terminal of inductor L, and a second terminal of inductor L can connect to an output terminal of the switching converter. A first terminal of power switch S2 can connect to a common terminal of the second terminal of power switch S1 and the first terminal of inductor L, and a second terminal of power switch S2 can connect to a reference ground of the switching converter. Output capacitor Co can connect between the output terminal of the switching converter and the reference ground, and in parallel with load $R_L$ for receiving output voltage Vo. In this example, power switch S1 is the main power switch, and power switch S2 is a rectifier switch. It should be understood that power switches S1 and S2 can be any type of field-effect transistors, such as metal-oxide-semiconductor field-effect transistors (MOSFET), other types of field-effect transistors and/or any other suitable types of transistors.

Control circuit 22 may adopt a closed-loop control mode to generate switching control signal pulse-width modulation (PWM) according to output voltage Vo, in order to control the switching states of power switches S1 and S2 to provide energy to load $R_L$. In this example, control circuit 22 can include ripple signal generation circuit 221, superimposing circuit 222, and switching control signal generation circuit 223. For example, ripple signal generation circuit 221 can generate ripple signal Vrip having the same frequency and phase as inductor current IL flowing through inductor L, and the variation range of ripple signal Vrip can be between zero and a preset value. That is, the peak-to-peak value of ripple signal Vrip can be the preset value (e.g., a value greater than zero). Further, superimposing circuit 222 can superimpose ripple signal Vrip on feedback voltage $V_{FB}$ to generate loop control signal $V_{FB1}$. Switching control signal generation circuit 223 can generate switching control signal PWM according to loop control signal $V_{FB1}$ and reference signal $V_{REF}$.

In one example, ripple signal generation circuit 221 can generate a triangular wave signal with the same frequency and phase as inductor current IL flowing through inductor L according to input voltage Vin and duty ratio D of the switching converter, and may generate ripple signal Vrip according to the triangular wave signal and the valley value of the triangular wave signal. It should be understood that ripple signal generation circuit 221 in this particular example generates the triangular wave signal with the same frequency and phase as inductor current IL flowing through inductor L according to the known variables of the switching converter, but other circuit structures realizing this functionality can also be utilized in certain embodiments.

As compared with other approaches, the control circuit in particular embodiments can generate loop control signal $V_{FB1}$ by superimposing ripple signal Vrip on feedback voltage $V_{FB}$, and can control the operation state of the power stage circuit according to loop control signal $V_{FB1}$ and reference signal $V_{REF}$. Since the variation range of ripple signal Vrip can be between zero and the preset value, the valley value of ripple signal Vrip may not change with the duty cycle of the switching converter, such that there may be no DC bias voltage between feedback voltage $V_{FB}$ and reference voltage $V_{REF}$ under the valley control method. Therefore, the control circuit may not need to correct the reference signal, so the correction circuit can be omitted. Also, there may be only one voltage loop used in the control circuit, which can quickly respond to a dynamic jump of the load, and may also ensure that the output voltage accuracy of the switching converter is increased in different applications.

Figure 4:
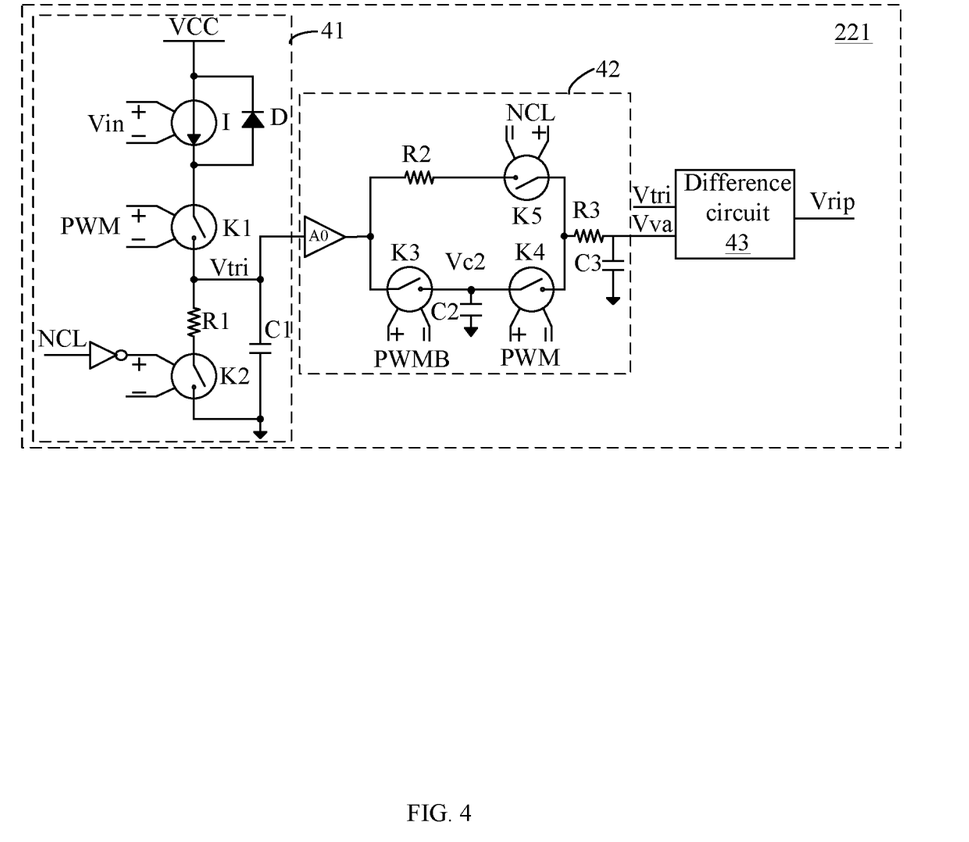
FIG. 4 is a schematic block diagram of an example ripple signal generation circuit, in accordance with embodiments of the present invention.

Referring now to FIG. 4, shown is a schematic block diagram of an example ripple signal generation circuit, in accordance with embodiments of the present invention. In this particular example, ripple signal generation circuit 221 can include triangular wave generation circuit 41, valley generation circuit 42, and difference circuit 43. For example, triangular wave generation circuit 41 can generate triangular wave signal Vtri with the same frequency and phase as inductor current IL, according to input voltage Vin and duty ratio D of the switching converter, in order to control the switching states of the power stage circuit. In this way, the resonance problem that may be caused by output voltage phase lag can be addressed since the equivalent series resistance of the output capacitor is too small. Further, valley generation circuit 42 can sample the valley value of triangular wave signal Vtri according to the switching state of the power switch, in order to generate valley signal Vva. Difference circuit 43 can perform a difference operation on triangular wave signal Vtri and valley signal Vva, in order to generate a ripple signal Vrip, where ripple signal Vrip has a variation range between zero and a preset value.

For example, triangle wave generation circuit 41 can include current source I, switch K1, and switch K2, which can connect in series between supply voltage VCC and the reference ground of the switching converter. Triangle wave generation circuit 41 can also include capacitor C1 and resistor R1. In this example, resistor R1 can connect in series with switch K2 to form a series structure, and capacitor C1 can connect in parallel with the series structure. Current source I can be controlled by input voltage Vin, in order to generate a predetermined current. Switch K1 can be controlled by switching control signal PWM, and switch K2 can be controlled by current zero-crossing signal NCL that represents inductor current IL reaches zero. Further, switch K2 can be controlled by an inverted signal of current zero-crossing signal NCL. When power switch S1 of the switching converter is turned on, switching control signal PWM can be active, thus switch K1 may be turned on, and current source I can begin to charge capacitor C1. When switching control signal PWM is inactive, switch K1 can be turned off. When current zero-crossing signal NCL is inactive (e.g., inductor current IL is not zero), switch K2 can be turned on, and thus capacitor C1 may be discharged through resistor R1.

When the switching converter operates in a steady state, the charge and discharge of capacitor C1 can reach a balanced state, and a stable triangular wave signal Vtri may be generated at non-grounded terminal of capacitor C1. Further, the rising duration and amplitude of triangular wave signal Vtri may be proportional to the duty cycle of the switching converter, and the phase and amplitude change of triangular wave signal Vtri can be consistent with those of the inductor current. In addition, when the switching converter operates in the discontinuous current mode, and current zero-crossing signal NCL is active, switch K2 can be turned off, and triangular wave signal Vtri may not be discharged through resistor R1 and remains stable. In this example, triangle wave generation circuit 41 can also include diode D connected in parallel at both ends of current source I, in order to provide a freewheeling loop for current source I when switches K1 and K2 are off.

In one example, valley generation circuit 42 can include switch K3, switch K4, switch K5, and capacitor C2. A first terminal of switch K3 can be an input terminal of valley generation circuit 42 for receiving triangular wave signal Vtri, a second terminal of switch K3 can connect to a first terminal of capacitor C2, and a second terminal of capacitor C2 can be grounded. A first terminal of switch K4 can connect to the first terminal of capacitor C2. A first terminal of switch K5 can be coupled to the first terminal of switch K3 through resistor R2, and a second terminal of switch K5 can connect to a second terminal of switch K4. In this example, switch K4 can be controlled by switching control signal PWM, switch K3 may be controlled by switching control signal PWMB that is an inverted signal of switching control signal PWM, and switch K5 can be controlled by current zero-crossing signal NCL.

Valley generation circuit 42 may also include a filter circuit connected to the common node of switches K4 and K5, and which can filter the voltage at the common node of switches K4 and K5, in order to generate valley signal Vva. In this example, the filter circuit can include resistor R3 and capacitor C3 connected in series between the common node of switches K4 and K5 and the reference ground, and valley signal Vva may be generated at the common node of resistor R3 and capacitor C3. In this example, valley generation circuit 42 can also include buffer A0 connected between the output terminal of triangular wave generating circuit 41 and the input terminal of valley generation circuit 42 to avoid the influence of valley generation circuit 42 on triangular wave signal Vtri, in order to optimize the circuit performance.

When the switching converter operates in the current continuous mode, since inductor current IL may not reach zero, current zero-crossing signal NCL can remain inactive, and switch K5 may remain in the off state. When switching control signal PWMB is active, power switch S2 in the switching converter can be turned on, switch K3 may be turned on, and capacitor C2 may receive the voltage across capacitor C1. That is, the voltage across capacitor C2 can be equal to triangular wave signal Vtri. When switching control signal PWM is active, power switch S1 in the switching converter may be turned on, power switch S2 can be turned off, and switch K4 may be turned on. At this time, the voltage across capacitor C2 can be the valley value of triangular wave signal Vtri, which may be transmitted to the filter circuit to generate valley signal Vva.

When the switching converter operates in the current discontinuous mode, and when current zero-crossing signal NCL is inactive, the operation process of valley generation circuit 42 can be the same as that in the current continuous mode. When switching control signals PWM and PWMB are both inactive, power switches S1 and S2 may both be turned off, and current zero-crossing signal NCL can be active. Thus, switch K5 may be turned on, and triangular wave signal Vtri can directly pass through the filter circuit, in order to generate valley signal Vva.

Figure 5:
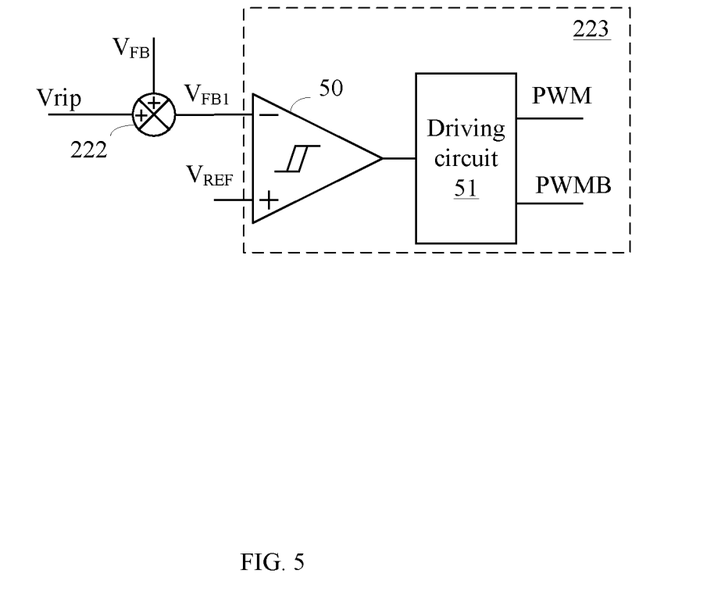
FIG. 5 is a schematic block diagram of an example control circuit, in accordance with the embodiments of the present invention.

Referring now to FIG. 5, shown is a schematic block diagram of an example control circuit, in accordance with the embodiments of the present invention. In this example, superimposing circuit 222 can superimpose ripple signal Vrip on feedback signal $V_{FB}$ to generate loop control signal $V_{FB1}$. Switching control signal generation circuit 223 may generate switching control signals for power switches S1 and S2 according to loop control signal $V_{FB1}$ and reference signal $V_{REF}$. In particular embodiments, switching control signal generation circuit 223 may utilize ripple control under a valley control mode to control the power stage circuit of the switching converter, and also utilize constant on-time control, in order to simplify the circuit structure.

For example, power switch S1 can be controlled to be turned on when the valley value of loop control signal $V_{FB1}$ reaches reference signal $V_{REF}$; that is, when feedback signal $V_{FB}$ is equal to reference signal $V_{REF}$. In one example, switching control signal generation circuit 223 can include a constant on-time control circuit for generating a reference signal according to the average value of triangular wave signal Vtri to adjust the on-time of power switch S1. For example, in the constant on-time control circuit, a ramp signal can be generated, and when the ramp signal rises from zero to the reference signal, power switch S1 may be turned off.

In this example, switching control signal generation circuit 223 can include comparator 50 and driving circuit 51. The inverting input terminal of comparator 50 may receive loop control signal $V_{FB1}$, the non-inverting input terminal may receive reference signal $V_{REF}$, and the output terminal may generate a comparison signal by comparing loop control signal $V_{FB1}$ with reference signal $V_{REF}$. Driving circuit 51 can connect to the output terminal of comparator 50, and may generate switching control signals PWM and PWMB according to the comparison signal. In this example, switching control signals PWM and PWMB can control power switches S1 and S2, respectively.

Figure 6:
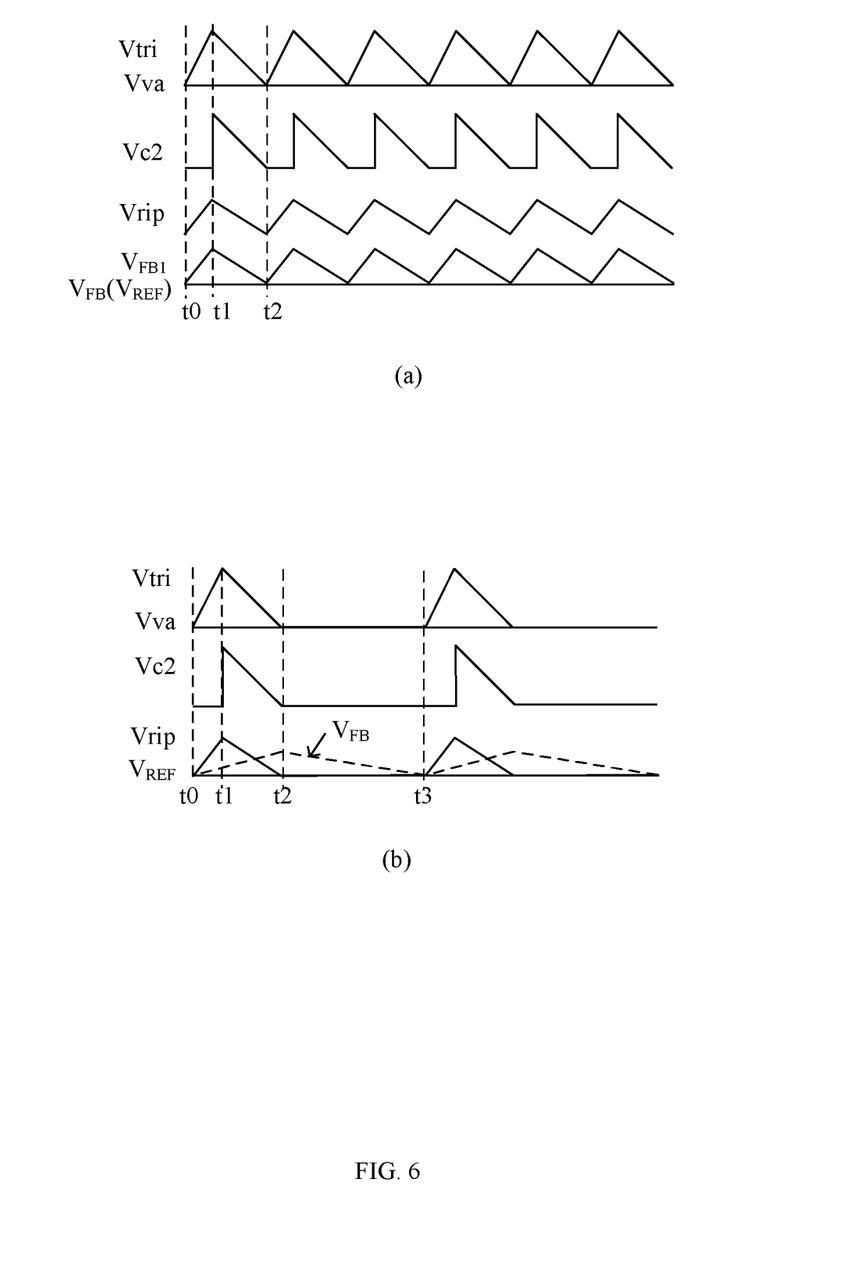
FIG. 6 is a waveform diagram of example operation of the switching converter, in accordance with embodiments of the present invention.

Referring now to FIG. 6, shown is a waveform diagram of example operation of the switching converter, in accordance with embodiments of the present invention. In (a) of FIG. 6, shown is a waveform diagram of example operation of the switching converter under the current continuous mode. In (b) of FIG. 6, shown is a waveform diagram of example operation of the switching converter under the current discontinuous mode. In this example, the switching converter may utilize the ripple control under the valley control mode. As shown in (a) of FIG. 6, triangular wave signal Vtri and the inductor current of the switching converter may have the same frequency and phase. The maximum and minimum values of voltage Vc2 across capacitor C2 can be the same as the maximum and minimum values of triangular wave signal Vtri, such that valley signal Vva may be obtained according to voltage Vc2. Also, valley signal Vva and the valley value of triangular wave signal Vtri can remain the same.

Triangular wave signal Vtri and valley signal Vva can be subjected to the difference operation to obtain ripple signal Vrip. Assuming that the peak-to-peak value of ripple signal Vrip is Vp, and ripple signal Vrip varies between zero and Vp, feedback signal $V_{FB}$ and ripple signal Vrip can be superimposed to generate loop control signal $V_{FB1}$, and thus loop control signal $V_{FB1}$ may vary between $V_{FB}$ and $V_{FB}$+Vp. At time t0, when the valley value of loop control signal $V_{FB1}$ is equal to reference signal $V_{REF}$, that is, feedback signal $V_{FB}$ and reference signal $V_{REF}$ are equal, the control circuit can control power switch S1 to turn on, and the inductor current may begin to rise. At time t1, power switch S1 can be turned off, power switch S2 may be turned on, and the inductor current can begin to decrease. At time t2, power switch S1 may be turned on again, and the switching converter can operate in a steady state in cycles.

As shown in (b) of FIG. 6, in the current discontinuous mode, the generation principles of triangular wave signal Vtri, voltage Vc2 across capacitor C2, valley signal Vva and ripple signal Vrip, are the same as those in (a) of FIG. 6. At time t0, when the valley value of loop control signal $V_{FB1}$ is equal to reference signal $V_{REF}$, that is, feedback signal $V_{FB}$ (shown by the dotted line in the figure) is equal to reference signal $V_{REF}$, the control circuit can control power switch S1 to turn on, and the inductor current may begin to rise. At time t1, power switch S1 can be turned off, power switch S2 may be turned on, and the inductor current can begin to decrease. At time t2, power switches S1 and S2 may both be turned off, and the inductor current can be zero, and the valley value may be retained. At time t3, power switch S1 can be turned on again, and the switching converter may operate in a steady state in cycles.

Figure 7:
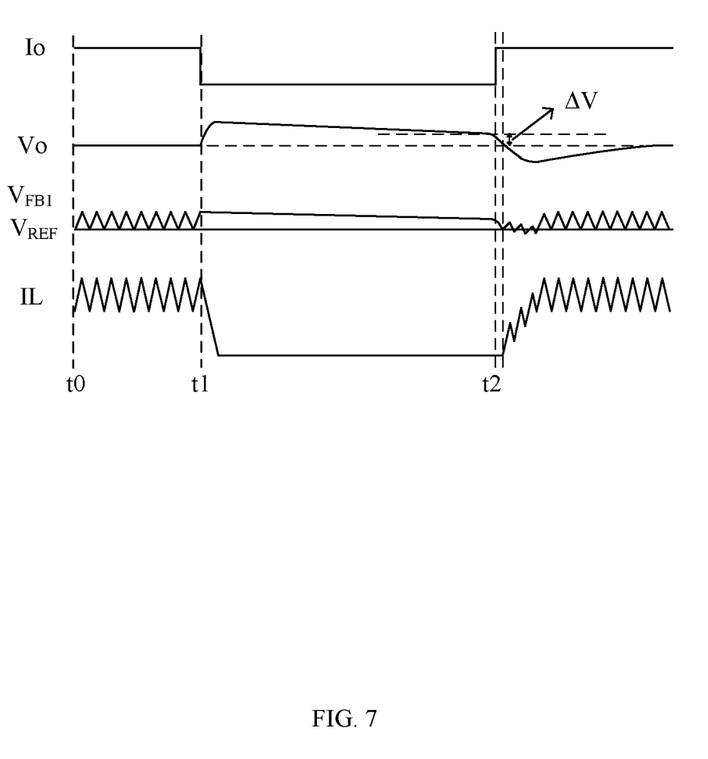
FIG. 7 is a waveform diagram of example operation of the switching converter when the load changes, in accordance with embodiments of the present invention.

Referring now to FIG. 7, shown is a waveform diagram of example operation of the switching converter when the load changes, in accordance with embodiments of the present invention. In this example, the buck converter is taken as an example for illustration. During time period t0-t1, the switching converter may operate in a steady state. Power switch S1 can be controlled to be turned on when the valley value of loop control signal $V_{FB1}$ is equal to reference signal $V_{REF}$. Then, inductor current IL can begin to rise, and power switch S1 may be controlled to be turned off after a predetermined time. Then, inductor current IL may decrease, such that a stable output voltage Vo can be generated during the steady state.

At time t1, the load jumps from a heavy-load to a no-load. Since inductor current IL cannot suddenly change, the energy is excessive, so output voltage Vo rises, such that loop control signal $V_{FB1}$ may remain greater than reference signal $V_{REF}$. At time t2, the load jumps from a no-load to a heavy-load. Since there may only be one voltage loop in the control circuit in this example, it can quickly respond to the sudden change of the load in response to loop control signal $V_{FB1}$. Thus, output voltage Vo may drop only a small voltage drop ΔV in a relatively short period of time, and the switching converter can return back to be in a steady state after a relatively short period of time. Therefore, the switching converter in particular embodiments has a relatively good dynamic response.

In particular embodiments, by superimposing a ripple signal with a variation range between zero and a preset value on the feedback voltage, a loop control signal may be generated, and the power stage circuit can be controlled according to the loop control signal and the reference signal. Further, the control circuit may not need to correct the reference signal, such that a correction circuit can be omitted. In addition, there may only be one voltage inner loop, which can quickly respond to the dynamic change of the load, and can ensure that the output voltage accuracy of the switching converter can be increased in different applications.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit for a switching converter, the control circuit comprising:
   a) a ripple signal generation circuit configured to generate a ripple signal with a same frequency and phase as an inductor current of the switching converter, wherein the ripple signal changes between zero and a preset value, and wherein the preset value is greater than zero;
   b) a superimposing circuit configured to superimpose the ripple signal on a feedback signal representing an output voltage of the switching converter, in order to generate a loop control signal; and
   c) a switching control signal generation circuit configured to generate switching control signals according to the loop control signal and a reference signal, in order to control a switching state of a power stage circuit in the switching converter.

2. The control circuit of claim 1, wherein the ripple signal generation circuit is configured to generate a triangular wave signal with a same frequency and phase as the inductor current of the switching converter, and to generate the ripple signal according to the triangular wave signal.

3. The control circuit of claim 2, wherein the ripple signal generation circuit is configured to generate the triangular wave signal according to an input voltage and a duty cycle of the switching converter.

4. The control circuit of claim 1, wherein the switching control signal generation circuit is configured to control a main power switch of the switching converter to be turned on when a valley value of the loop control signal is equal to the reference signal.

5. The control circuit of claim 4, wherein a conduction time of the main power switch is set according to an input voltage and a duty cycle of the switching converter.

6. The control circuit of claim 1, wherein the ripple signal generation circuit comprises:
   a) a triangle wave generation circuit configured to generate a triangle wave signal with a same frequency and phase as the inductor current according to an input voltage and a duty cycle of the switching converter;
   b) a valley generation circuit configured to sample a valley value of the triangular wave signal, in order to generate a valley signal; and
   c) a difference circuit configured to perform a difference operation on the triangular wave signal and the valley signal, in order to generate the ripple signal.

7. The control circuit of claim 6, wherein the triangle wave signal generation circuit comprises:
   a) a current source configured to generate a current proportional to the input voltage of the switching converter;
   b) a first capacitor coupled in series with the current source, wherein the triangle wave signal is generated at one terminal of the capacitor;
   c) a first switch configured to control the current source to charge the first capacitor during a conduction time of a main power switch of the switching converter; and
   d) a second switch configured to discharge the first capacitor when the first switch is turned off and the inductor current is not zero.

8. The control circuit of claim 6, wherein the valley generation circuit comprises:
   a) a third switch, wherein a first terminal of the third switch receives the triangular wave signal;
   b) a second capacitor, wherein a first terminal of the second capacitor is coupled to a second terminal of the third switch, and a second terminal of the second capacitor is grounded;
   c) a fourth switch, wherein a first terminal of the fourth switch is coupled to the first terminal of the second capacitor; and
   d) wherein during a period when the main power switch is turned off, the second capacitor receives the triangular wave signal, and wherein when the main power switch is turned on, the valley generation circuit is configured to generate the valley signal based on a voltage across the second capacitor.

9. The control circuit of claim 8, wherein the valley generation circuit further comprises a fifth switch configured to be turned on when the inductor current reaches zero, and wherein the valley generation circuit is configured to generate the valley signal according to the triangular wave signal when the fifth switch is turned on.

10. The control circuit of claim 9, wherein the valley generation circuit further comprises a filter circuit coupled to a common node of the fourth switch and the fifth switch, and being configured to filter a voltage at the common node to generate the valley signal.

11. The control circuit of claim 1, wherein the switching control signal generation circuit comprises:
   a) a comparator having a first input terminal for receiving the loop control signal, a second input terminal for receiving the reference signal, and an output terminal for generating a comparison signal; and b) a driving circuit configured to generate the switching control signals for controlling the power stage circuit according to the comparison signal.

12. A switching converter, comprising a power stage circuit and control circuit, the control circuit comprising:
   a) a ripple signal generation circuit configured to generate a ripple signal with a same frequency and phase as an inductor current of the switching converter, wherein the ripple signal changes between zero and a preset value, and wherein the preset value is greater than zero;
   b) a superimposing circuit configured to superimpose the ripple signal on a feedback signal representing an output voltage of the switching converter, in order to generate a loop control signal; and
   c) a switching control signal generation circuit configured to generate switching control signals according to the loop control signal and a reference signal, in order to control a switching state of the power stage circuit.

* * * * *